No. 628,156. Patented July 4, 1899.
J. CLEAVENGER.
AXLE LUBRICATOR.
(Application filed Mar. 31, 1898.)
(No Model.)
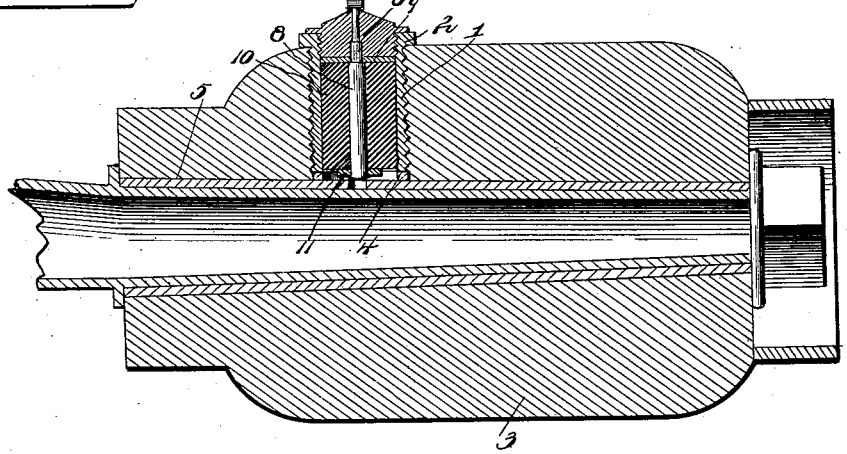
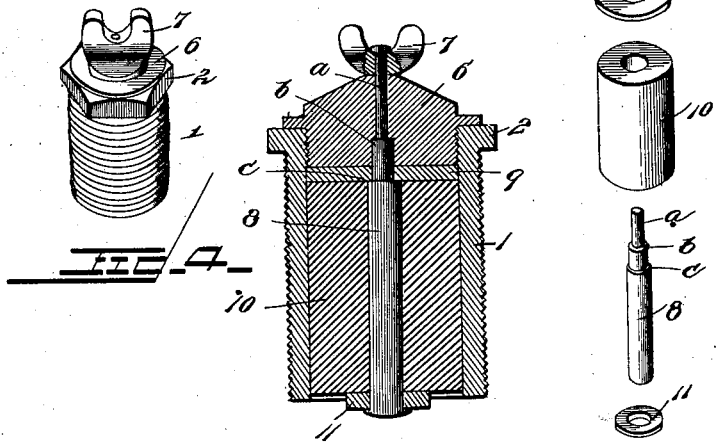
Witnesses
R. H. Shepard
V. B. Hillyard
James Cleavenger, Inventor
By his Attorneys,
C. A. Snow & Co.

UNITED STATES PATENT OFFICE.

JAMES CLEAVENGER, OF WAYNESBURG, PENNSYLVANIA.

AXLE-LUBRICATOR.

SPECIFICATION forming part of Letters Patent No. 628,156, dated July 4, 1899.

Application filed March 31, 1898. Serial No. 675,950. (No model.)

*To all whom it may concern:*

Be it known that I, JAMES CLEAVENGER, a citizen of the United States, residing at Waynesburg, in the county of Greene and State of Pennsylvania, have invented a new and useful Axle-Lubricator, of which the following is a specification.

The purpose of the present invention is the provision of a simple and effective device which can be readily applied to the hub of any ordinary vehicle-wheel for lubricating the spindle or axle without requiring the removal of the wheel, as is generally practiced when it is required to lubricate the axle.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a vertical section of an axle-lubricator embodying the features of this invention, the same being shown applied to the hub of a vehicle-wheel. Fig. 2 is a detail perspective view of the lubricator. Fig. 3 is a detail view of the plunger and parts intimately associated therewith dismembered and arranged in a group. Fig. 4 is a vertical central section of the lubricator on a larger scale, showing more clearly the relation of the parts.

Corresponding and like parts are referred to in the following description and indicated in the views of the drawings by the same reference characters.

The lubricator comprises a tube 1, of a length to reach the axle-box when in position. This tube is externally threaded to make positive connection with the walls of a bore formed in a side of the hub 3. A head 2 is provided at the outer end of the tube and is made angular or otherwise constructed to receive a wrench or like tool, by means of which the tube is screwed into the bore of the hub. A washer 4 is interposed between the inner or lower end of the tube 1 and the axle-box 5, so as to secure a tight joint and prevent the oil from soaking into the wooden hub. The tube is internally threaded at its outer end to receive the threaded portion of a flanged plug 6, by means of which the tube is closed, thereby preventing the escape of lubricant or the entrance of dust or other foreign matter into the tube. The flanged plug has a winged projection 7, to be grasped between the fingers of the hand when it is required to tighten or loosen the plug.

A plunger operates within and fills the tube 1 and serves to expel the lubricant supplied to the tube and force it through an opening in the axle-box in line with the tube 1, whereby the oil is distributed or caused to pass to the parts to be lubricated. This plunger consists of a stem 8, having a collar 9 near its upper or outer end, to engage with the inner side of the plug 6 to permit of the free and independent rotation of the latter, a rubber tube 10, mounted upon the lower end portion of the stem, and a washer 11, placed upon the lower end of the stem and confining the rubber tube 10 between it and the collar 9, the lower end of the stem being upset or riveted, so as to retain the washer 11 in place. The rubber tube 10 corresponds with the internal diameter of the tube 1 and fits snugly therein, and when the plunger is in place and the plug 6 is screwed home the inner or lower end of the plunger is about in the plane of the inner end of the tube 1 and fills the latter, thereby forcing the lubricant therefrom and preventing any returning to the tube should the latter occupy the lowest position with reference to the axle.

The swivel connection between the stem 8 and the plug 6 admits of the latter making screw-threaded connection with the tube, whereas the body of the plunger is enabled to move in and out without receiving any rotary movement.

The upper end portion of the stem 8 is reduced, forming the reduced terminal portion $a$ and the shoulders $b$ and $c$, the latter supporting the collar 9. The reduced terminal portion $a$ passes vertically through a central opening of the plug 6, and its projecting end is upset or riveted to retain said plug in position, as indicated most clearly in Fig. 4. The part 10 constitutes, in effect, an elastic plunger and is a cylindrical block of india-rubber of such relative dimensions as to nearly or quite fill the tube 1, so as to expel all the lubricant therefrom when the plunger is forced home. This elastic plunger is confined between the collar 9 and the washer 11 and is compressible by upsetting the lower end of the stem 8 more or less, whereby a tight fit can be secured and maintained between the plunger and its tube 1.

The lubricator being applied about as shown in Fig. 1 and it being required to lubricate the axle, the wheel is turned so as to bring the device into an upright position, after which the flanged plug and the plunger connected therewith are removed. A quantity of oil is poured into the tube, after which the plunger is inserted into the tube and pressed therein, whereby the lubricant is expelled through the opening in communication with the tube and caused to pass to the parts to be lubricated. The flanged plug is made fast by the screw-thread connection between it and the tube, and this screw-thread connection enables the plunger to be given the final forward movement, so as to expel the last portion of lubricant remaining in the tube. The flange of the plug overlapping the outer end of the tube prevents the ingress of dust or foreign matter into the screw-thread joint formed between the flanged plug and tube.

Having thus described the invention, what is claimed, and desired to be secured by Letters Patent, is—

An axle-lubricator comprising a tube adapted to be fitted within an opening formed within a vehicle-hub, and provided with an interiorly-threaded portion at its outer end, a plunger-stem provided near one end with a pair of concentric shoulders in different planes, a solid cylindrical rubber plunger secured upon the stem and having a sliding registering fit within the tube, said plunger being of a size nearly equaling the entire interior area of the tube, an exteriorly-threaded closure-plug revolubly mounted upon one end of the stem beyond the plunger and bearing directly upon one of the shoulders of the stem, and a collar or disk interposed between the contiguous ends of the plunger and plug and fitting upon the other of said shoulders of the stem, said collar or disk permitting a free and independent rotation of the plug, substantially as set forth.

In testimony that I claim the foregoing as my own I have hereto affixed my signature in the presence of two witnesses.

JAMES CLEAVENGER.

Witnesses:
GEO. W. BEALL,
L. L. RICH.